(12) United States Patent
Jung et al.

(10) Patent No.: US 9,484,029 B2
(45) Date of Patent: Nov. 1, 2016

(54) ELECTRONIC APPARATUS AND METHOD OF SPEECH RECOGNITION THEREOF

(71) Applicant: SAMSUNG ELECTRONICS CO., LTD., Suwon-si (KR)

(72) Inventors: Chi-sang Jung, Seoul (KR); Byung-jin Hwang, Swon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/670,724

(22) Filed: Mar. 27, 2015

(65) Prior Publication Data

US 2016/0035349 A1 Feb. 4, 2016

(30) Foreign Application Priority Data

Jul. 29, 2014 (KR) ........................ 10-2014-0096743

(51) Int. Cl.
| | | |
|---|---|---|
| G10L 15/00 | (2013.01) | |
| G10L 15/22 | (2006.01) | |
| G10L 17/02 | (2013.01) | |
| G10L 15/06 | (2013.01) | |
| G10L 15/02 | (2006.01) | |
| G10L 15/26 | (2006.01) | |
| G10L 17/06 | (2013.01) | |
| G10L 15/08 | (2006.01) | |

(52) U.S. Cl.
CPC ............ *G10L 15/22* (2013.01); *G10L 15/063* (2013.01); *G10L 17/02* (2013.01); *G10L 15/265* (2013.01); *G10L 17/06* (2013.01); *G10L 2015/025* (2013.01); *G10L 2015/0638* (2013.01); *G10L 2015/088* (2013.01); *G10L 2015/223* (2013.01)

(58) Field of Classification Search
CPC ..... G10L 17/005; G10L 17/02; G10L 17/06; G10L 17/04; G10L 17/24; G10L 15/00; G10L 15/22; G10L 15/265; G10L 15/10; G10L 15/04; G10L 15/063; G10L 15/08; H05K 999/99
USPC ....... 704/231, 246, 240, 243, 244, 247, 249, 704/251, 235, 270, 275
See application file for complete search history.

(56) References Cited

U.S. PATENT DOCUMENTS 6,182,037 B1    1/2001  Maes
6,385,535 B2 *  5/2002  Ohishi ......................... 701/425
(Continued)

FOREIGN PATENT DOCUMENTS

KR          100321835 B1    4/2002
KR          20050023941 A    3/2005
(Continued)

*Primary Examiner* — Vu B Hang
(74) *Attorney, Agent, or Firm* — Sughrue Mion, PLLC

(57) ABSTRACT

An electronic apparatus and a method of speech recognition thereof are disclosed. According to the method of speech recognition of the electronic apparatus, the method includes receiving a speech of a speaker, extracting phonemic characteristics for recognizing a speech and voice print characteristics for registering the speaker by analyzing the received speech of the speaker, and in response to the speech of the speaker corresponding a registered trigger word or phrase, based on the extracted phonemic characteristics, changing an execution mode to a speech recognition mode of the electronic apparatus and registering the extracted voice print characteristics as voice print characteristics of the speaker who spoke the speech.

20 Claims, 14 Drawing Sheets

(56) References Cited

U.S. PATENT DOCUMENTS

| | | |
|---|---|---|
| 7,136,817 B2 | 11/2006 | Schroder et al. |
| 8,286,071 B1 * | 10/2012 | Zimmerman ......... G06F 17/248 704/235 |
| 2005/0049862 A1 | 3/2005 | Choi et al. |
| 2011/0022386 A1 * | 1/2011 | Gatzke .................... G10L 15/06 704/235 |
| 2013/0173268 A1 * | 7/2013 | Weng ...................... G10L 17/22 704/249 |

FOREIGN PATENT DOCUMENTS

| | | |
|---|---|---|
| KR | 100779242 B1 | 11/2007 |
| KR | 20090023978 A | 3/2009 |
| KR | 20100030483 A | 3/2010 |

* cited by examiner

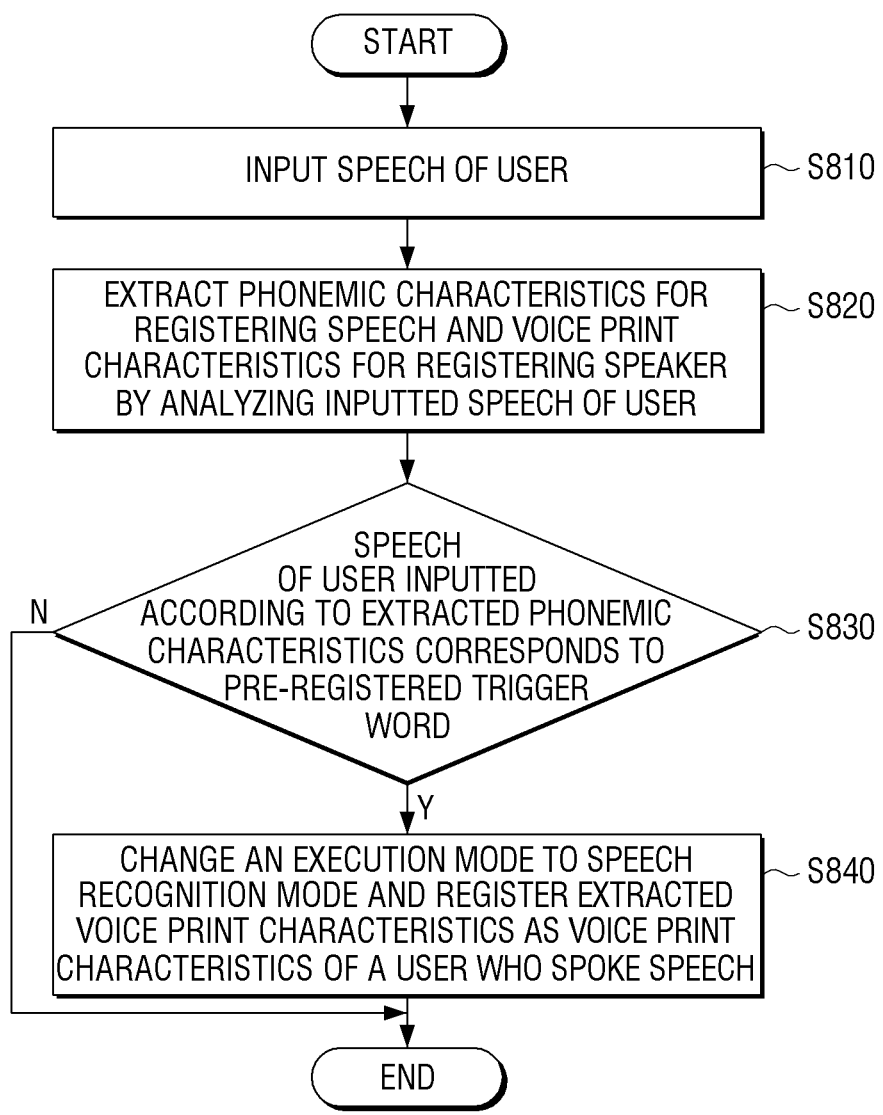

ELECTRONIC APPARATUS AND METHOD OF SPEECH RECOGNITION THEREOF

CROSS-REFERENCE TO RELATED APPLICATIONS

This application claims priority from Korean Patent Application No. 10-2014-0096743, filed in the Korean Intellectual Property Office on Jul. 29, 2014, the disclosure of which is incorporated herein by reference in its entirety.

BACKGROUND

1. Field

A method and an apparatus consistent with the exemplary embodiments relate to an electronic apparatus and a method of speech recognition thereof. More particularly; the exemplary embodiments relate to an electronic apparatus which can register a trigger word or phrase for starting a speech recognition mode and can register a user who uses the electronic apparatus at the same time, and a method of speech recognition thereof.

2. Description of the Prior Art

Recently, the number of electronic apparatuses equipped with a speech recognition function has increased rapidly. A user can execute a speech recognition mode by changing a mode of an electronic apparatus to a speech recognition mode. Accordingly, these days, electronic apparatuses tend to equip a user interface for changing a mode to a speech recognition mode in the electronic apparatuses themselves or a separate control apparatus such as a remote control to control the electronic apparatuses.

Now, a user can execute a speech recognition mode of an electronic apparatus easily by speaking a predetermined word. A word predetermined to execute a speech recognition mode is called a trigger word. A trigger word may be set in an electronic apparatus, but a user may directly set a word which is easy for the user to use according to the user's settings.

In addition, a speech recognition mode may provide not only a function of controlling an electronic apparatus by speech, but also via a menu set by each user and a favorite program of each user. Specifically, an electronic apparatus can recognize a user who speaks by using a voice print which is a graph acquired by a result of a temporal analysis of a frequency distribution of a user's speech.

Conventionally, a method of recognizing a trigger word registered by a user who directly speaks and a method of recognizing the speaker who speaks as described above were performed in a separate module.

Accordingly, a user had to go through a separate process for registering a trigger word and a speaker, which was inconvenient. In addition, an electronic apparatus was equipped with a module for registering a trigger word and a module for registering a speaker respectively, which increased unnecessary configurations of the electronic apparatus.

Accordingly, there is a demand for a technology which enables a user to easily register a trigger word and a speaker.

SUMMARY

Aspects of the exemplary embodiments relate to an electronic apparatus where a user can register a trigger word or phrase and a speaker at the same time, and a method of speech recognition thereof.

According to an exemplary embodiment, a method of speech recognition of an electronic apparatus includes receiving a speech of a speaker, extracting phonemic characteristics for recognizing a speech and voice print characteristics for registering the speaker by analyzing the received speech of the speaker, and in response to the speech of the speaker corresponding to a pre-registered trigger word or phrase based on the extracted phonemic characteristics, changing to a speech recognition mode of the electronic apparatus and registering the extracted voice print characteristics as voice print characteristics of the speaker who spoke the speech.

In addition, the method may further include displaying a user interface (UI) for receiving the speech corresponding to the trigger word or phrase in text form and in response to the text being input through the UI, registering the input text as the trigger word or phrase.

The method may further include receiving the speech of the speaker who speaks the speech, if the speech does not correspond to the pre-registered trigger word or phrase, analyzing the input speech of the speaker and converting the speech into text data, and registering the converted text data as a newly registered trigger word or phrase.

In addition, the extracting may further include determining whether or not a sound inputted through a microphone equipped in the electronic apparatus includes the speech of the speaker, and classifying a portion of the sound which is determined to correspond to the speech of the speaker and detecting characteristics of the speech of the speaker for the determined portion.

In addition, the detecting characteristics of the speech of the speaker may include extracting the phonemic characteristics and the voice print characteristics from the speech of the speaker, in parallel.

The method may further include in response to the extracted voice print characteristics not being within a critical range of voice print characteristics of a user registered in the electronic apparatus, registering the extracted voice print characteristics as voice print characteristics of a new user.

The method may further include, if the extracted voice print characteristics are within a critical range of voice print characteristics of a user registered in the electronic apparatus, changing an execution mode of the electronic apparatus to the speech recognition mode corresponding to the registered user.

According to an exemplary embodiment, an electronic apparatus may include a speech input receiver configured which receives a speech of a speaker and a controller configured to extract phonemic characteristics for recognizing the speech and voice print characteristics for registering the speaker by analyzing the speech of the speaker received through the speech input receiver, and the controller configured to, in response to the speech of the speaker corresponding to a predetermined trigger word or phrase based on the extracted phonemic characteristics, change a mode of the electronic apparatus to a speech recognition mode and register the extracted voice print characteristics as voice print characteristics of the speaker who spoke the speech.

In addition, the apparatus may further include a display, and the controller may control the display to display a user interface (UI) for receiving text and in response to the text being input through the UI, register the input text as a new trigger word or phrase.

Meanwhile, if the speech of the speaker is input through the speech input while a user interface (UI) for registering the trigger word or phrase is displayed, the controller may analyze the input speech of a user, convert the speech into text data, and register the converted text data as a new trigger word or phrase.

The controller may determine whether or not a sound inputted through a microphone includes the speech of the speaker, detect a portion of the sound which corresponds to the speech of the speaker, and detect characteristics of the speech of the speaker.

Meanwhile, the controller extracts the phonemic characteristics and the voice print characteristics from detected characteristics of the speech of the speaker, in parallel.

The apparatus may further include a storage, and in response to the extracted phonemic characteristics not being within a critical range of voice print characteristics of a user pre-registered in the storage, the controller may register the extracted voice print characteristics as voice prints characteristics of a new user.

In response to the extracted voice print characteristics being within a critical range of voice print characteristics of a user registered in the electronic apparatus, the controller may change an execution mode of the electronic apparatus to the speech recognition mode which corresponds to the registered user.

Also, the controller may extract the phonemic characteristics and the voice print characteristics from detected characteristics of the speech of the speaker, simultaneously.

According to the various exemplary embodiments, a user may register a trigger word or phrase and a speaker at the same time through an integrated module included in the electronic apparatus.

BRIEF DESCRIPTION OF THE DRAWINGS

The above and/or other aspects of the present disclosure will be more apparent by describing the present disclosure with reference to the accompanying drawings, in which:

FIG. 8 is a flow chart illustrating a method of a speech recognition mode of an electronic apparatus according to an exemplary embodiment;

DESCRIPTION OF EXEMPLARY EMBODIMENTS

Figure 1:
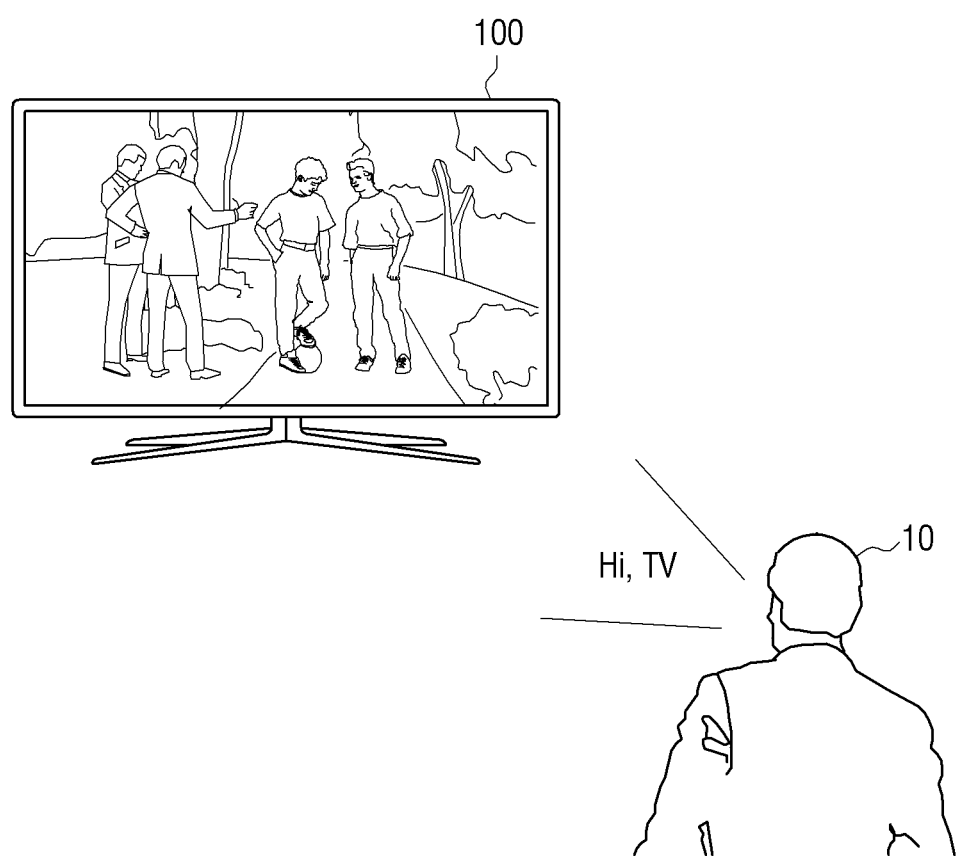
FIG. 1 is a view illustrating an electronic apparatus and a user who speaks a trigger word or phrase according to an exemplary embodiment.

Hereinafter, exemplary embodiments will be described in detail with reference to the accompanying drawings. In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a view illustrating a situation in which a user 10 utters a trigger phrase in order to use a speech recognition function of the electronic apparatus 100 according to an exemplary embodiment. In FIG. 1, a TV is illustrated as an example of the electronic apparatus 100, but the electronic apparatus 100 is not limited thereto, and it may be embodied as various types of electronic apparatuses such as a smart phone, a tablet PC, a digital camera, a camcorder, a laptop, and a plasma display panel (PDP) which include a speech recognition function.

The electronic apparatus 100 may include a microphone (now shown). Accordingly, the electronic apparatus 100 may receive a speech of the user 10 which was spoken within a certain distance. In addition, it may be determined whether the speech received from the user 10 is a trigger word or phrase or not by analyzing the received speech. In other words, a trigger word or phrase may be a short word or phrase which consists of pre-determined three or four syllables or words such as "Hi TV". If the received word or phrase is determined to be a trigger word or phrase, the electronic apparatus 100 may change a control mode of the electronic apparatus 100 to a speech recognition mode.

Meanwhile, a trigger word or phrase may be predetermined according to the type of the electronic apparatus 100, or a user may directly register a trigger word or phrase. In other words, the electronic apparatus 100 may store various types of trigger words or phrases. In addition, the user may set a word the user wants to use as a trigger word in trigger word settings of the electronic apparatus 100. Specifically, the user may set a trigger word by inputting text data by using an external control apparatus for controlling the electronic apparatus 100 or the electronic apparatus 100 itself, or by speaking a word the user wants to use for the electronic apparatus 100. A method of registering a trigger word will be described later in detail.

In addition, the electronic apparatus 100 may register a speaker by using a trigger word or phrase which is spoken by a user to register the word or phrase as a trigger word or phrase or to run a speech recognition mode. In other words, the electronic apparatus 100 may detect voice print characteristics by analyzing the received word or phrase. By using the detected voice print characteristics, the electronic apparatus 100 may register the user who spoke the trigger word or phrase, as a new speaker. Moreover, if the detected voice print characteristics are voice print characteristics of a predetermined speaker, the electronic apparatus 100 may change a control mode of the electronic apparatus 100 to a speech recognition mode according to the registered speaker. A method of registering and recognizing a speaker will be described in detail later.

Figure 2:
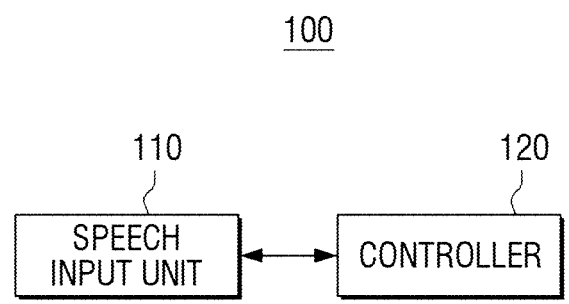
FIG. 2 is a block diagram briefly illustrating a configuration of an electronic apparatus according to an exemplary embodiment.

FIG. 2 is a block diagram briefly illustrating a configuration of the electronic apparatus 100 according to an exemplary embodiment. As illustrated in FIG. 2, the electronic apparatus 100 includes a speech input unit 110 and a controller 120.

The speech input unit 110 is an element configured to receive a speech of a user. The speech input unit 119 may include a microphone (not shown) and may receive a speech of a user through the microphone. The microphone may be included in the electronic apparatus 100. In addition, the microphone may be included in an external apparatus such as a remote controller to control the electronic apparatus 100. At this time, the remote controller may receive a speech of a user through the microphone, and transmits the speech of a user to the speech input unit 110.

Meanwhile, the controller 120 is an element configured to control an overall operation of the electronic apparatus 100. Particularly, the controller 120 may extract phonemic characteristics for recognizing speech and voice print characteristics for registering a speaker by analyzing the speech of a user inputted through the speech input unit 110. In other words, if the speech of a user which was inputted according to the extracted phonemic characteristics corresponds to a predetermined trigger word or phrase, the controller 120 may change a control mode of the electronic apparatus 100 to a speech recognition mode and register the extracted voice print characteristics as voice print characteristics of a user who spoke the word or phrase.

Particularly, the controller 120 may detect a portion of a speech which corresponds to a speech of a user by determining whether a sound inputted through a microphone includes the speech of a user or not, and may detect characteristics of the speech of a user from the determined speech portion. In particular, the controller 120 may extract phonemic and voice print characteristics from the detected characteristic of the speech of a user in parallel or simultaneously.

Phonemic characteristics are data related to a result of analyzing a speech of a user as part of a speech recognition function. Voice print characteristics are characteristics of an extracted voice print which can be used to distinguish a user who spoke a speech. In other words, a voice print, which is a result of a temporal disassembly of a frequency distribution of a speech of a user, is different for different users since structures of a mouth, a vocal cord, and a throat of users are different.

Accordingly, the controller 120 may register a speech of a user inputted according to the extracted phonemic characteristics as a trigger word or phrase or may determine whether or not the inputted speech of a user corresponds to a predetermined trigger word or phrase. In addition, the controller 120 may register a speaker in the electronic apparatus 100 by using the extracted voice print characteristics, or may determine whether or not the extracted voice print characteristics are voice print characteristics of a predetermined speaker.

Specifically, if the extracted voice print characteristics are not within a critical range of voice print characteristics of a pre-stored user, the extracted voice print characteristics may be registered as voice print characteristics of a new user. If the extracted voice print characteristics are not within a critical range of voice print characteristics of a pre-stored user, an execution mode of the electronic apparatus 100 may be changed to a speech recognition mode corresponding to a pre-registered user.

Figure 3:
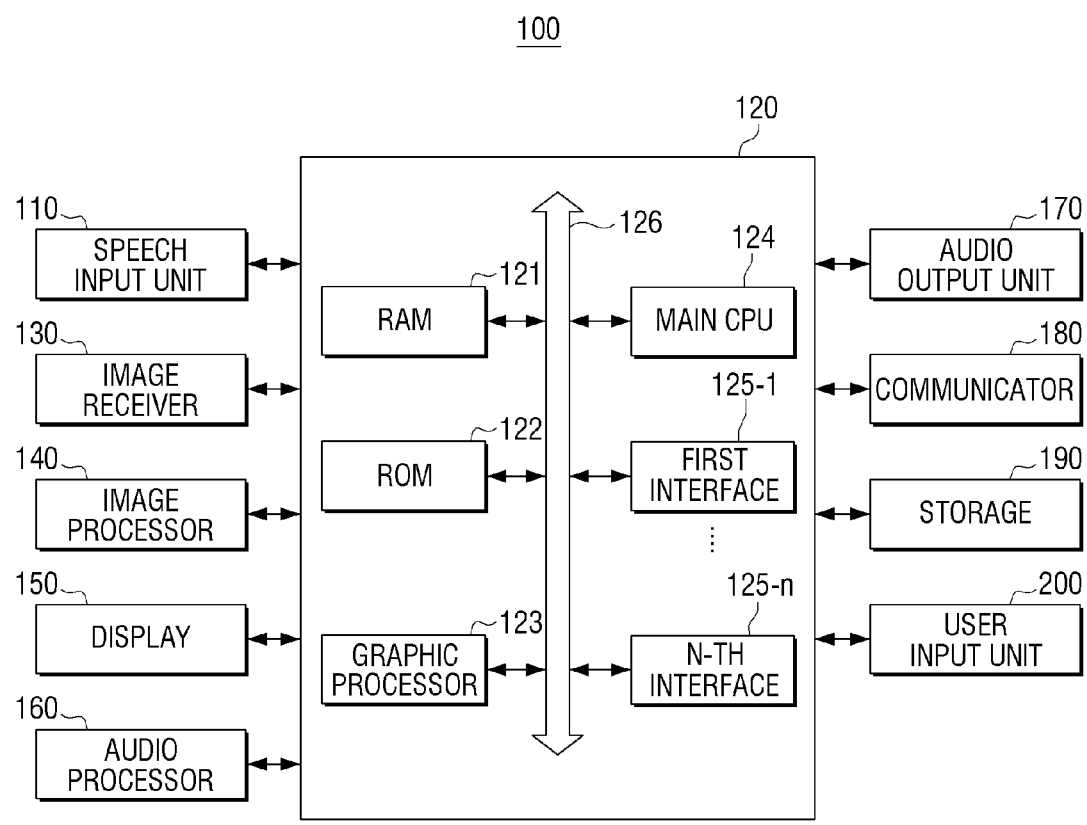
FIG. 3 is a block diagram illustrating a configuration of an electronic apparatus in detail according to an exemplary embodiment.

Meanwhile, the electronic apparatus 100 may further include elements such as the elements illustrated in FIG. 3. Specifically, the electronic apparatus 100 may include the speech input unit 110, the controller 120, a display 150, an image receiver 130, an image processor 140, an audio processor 160, an audio output unit 170, a communicator 180, a storage 190, and a user input unit 200. FIG. 3 illustrates all types of elements by giving an example of an electronic apparatus 100 which is equipped with various functions such as a speech recognition function, a speaker registration function, a speaker recognition function, a communication function, a video playback function, and a display function. Accordingly, according to the exemplary embodiment, some of the elements illustrated in FIG. 3 may be omitted or changed, and other elements may be added. Descriptions which overlap the descriptions already described will not be provided again.

The image receiver 130 receives image data through various sources. For example, the image receiver 130 may receive broadcasting data from an external broadcasting station, may receive image data from an external server in real-time, and may receive image data stored in the storage 170 provided inside of the electronic apparatus 100.

The image processor 140 is an element which processes image data received from the image receiver 130. The image processor 140 may perform various types of image processing for image data such as decoding, scaling, noise filtering, frame rate converting, and resolution converting.

The display 150 is an element which displays various types of images and a user interface (UI). In other words, the display 150 may display a video frame of image data received from the image receiver 130 and processed in the image processor 140, and at least one of various types of screens generated in the graphic processor 123.

The display 150 displays a user interface (UI) for registering a trigger word or phrase by a control of the controller 120. Particularly, the display 150 may display a UI for receiving a trigger word or phrase by text or a UI for receiving a trigger word or phrase by a speech.

The audio processor 160 is an element which processes audio data. In the audio processor 160, different kinds of processing for audio data such as decoding, amplifying, and noise filtering may be performed. Audio data processed in the audio processor 160 may be output through the audio output unit 170.

The audio output unit 170 is an element which outputs not only all kinds of audio data processed in the audio processor 160, but outputs also all sorts of notification sounds and speech messages. At this time, the audio processor 170 may be embodied as a speaker, but this is just an exemplary embodiment, and the audio processor 170 may be embodied as an audio terminal.

The communicator 180 is an element which communicates with all types of external apparatuses and external servers according to all kinds of communication methods. The communicator 180 may include various types of communication modules such as a Universal Serial Bus (USB) module, a WiFi module, a Bluetooth module, and a Near-Field Communication (NFC) module. At this time, the WiFi module, the Bluetooth module, and the NFC module perform communication by way of Wifi, Bluetooth, and NFC, respectively. Among those modules, the NFC module refers to a module using NFC in a band of 13.56 MHz among various types of RFID frequency bands such as 135 kHz, 13.56 MHz, 433 MHz, 860-960 MHz, and 2.45 GHz. The WiFi module or the Bluetooth module first may transmit and receive various kinds of connection information such as subsystem identification (SSID) and a session key for communication and may receive various other kinds of information.

Meanwhile, if phonemic characteristics and voice print characteristics are extracted by analyzing an inputted speech of a user in an external server, the communicator 180 may transmit the inputted speech of a user to the external server. In addition, speech data which is converted from the inputted speech of a user may be transmitted to the external server through the communicator 180.

If a database for phonemic and voice print characteristics is stored in an external server or an external storage apparatus, the communicator 180 may transmit the extracted phonemic characteristics and voice print characteristics to the external server or the storage apparatus. In addition, the controller 120 may transmit pre-stored data from the external server or the storage apparatus through the communicator 180 in order to compare the extracted phonemic and voice print characteristics with the pre-stored data.

The storage 190 may store different kinds of results of analysis of a speech of a user by controlling the controller 120, and a word or phrase registered as a trigger word or phrase. Specifically, the storage 190 may store a trigger word or phrase according to phonemic characteristics obtained by analyzing the speech of a user. Moreover, the storage 190 may store the analyzed voice print characteristics as voice print characteristics of a user who spoke the speech of a user.

Figure 4:
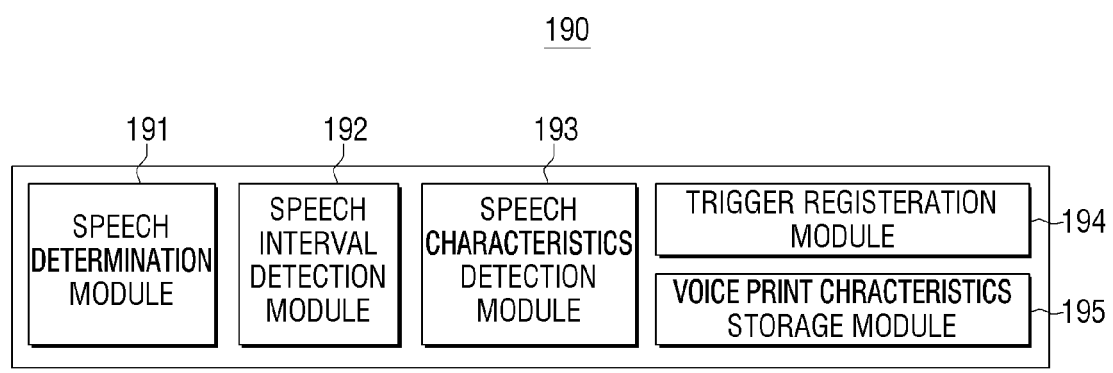
FIG. 4 is a block diagram illustrating a configuration of a storage according to an exemplary embodiment.

The storage 190 may store various kinds of software modules and data for operating the electronic apparatus 100. Specifically, as illustrated in FIG. 4, the storage 190 may store software modules such as a speech determination module 191, a speech interval detection module 192, a speech characteristics detection module 193, a trigger registration module 194, and a voice print characteristics storage module 195.

The speech determination module 191 is an element which determines whether a sound inputted through the speech input unit 110 is a speech of a user or not. The speech interval detection module 192 is an element which detects a duration of time corresponding to a portion of a speech which is determined to be a speech of a user from among sounds inputted through the speech input unit 110.

In other words, if a sound is inputted through the speech input unit 110, it is determined whether the sound is a speech of a user or not through the speech determination module 191 and the speech interval detection module 192, and a duration of time corresponding to a portion of speech determined to be a speech of a user may be detected.

However, the speech characteristics detection module 193 is an element which detects phonemic characteristics and voice print characteristics. In other words, the electronic apparatus 100 may detect phonemic and voice print characteristics through the speech characteristics detection module 193 even though the electronic apparatus 100 is not equipped with a separate module for extracting phonemic characteristics and a separate module for extracting voice print characteristics.

The trigger registration module 194 is a module for registering a word or phrase according to the phonemic characteristics extracted through the speech characteristics detection module 193, as a trigger word or phrase. In other words, as a result of extracting phonemic characteristics, if an inputted sound is "HI TV", the trigger registration module 194 may register the "HI TV" as a trigger phrase.

The voice print characteristics storage module 195 is a module which stores voice print characteristics extracted through the speech characteristics detection module 193. In other words, the voice print characteristics storage module 195 may store voice print characteristics according to a speaker who speaks a speech.

The controller 120 may detect a speaker who spoke the inputted speech by using voice print characteristics according to information related to at least one speaker stored in the voice print characteristics storage module 195 if the speech of a user is inputted through the input unit 110.

As described above, a plurality of software modules may be stored in the storage 190 included in the electronic apparatus 100, but this is just an exemplary embodiment, and the above-described modules may be stored in an external server or an external storage apparatus.

Back to FIG. 3, the user input unit 200 receives a user command to control overall operations of the electronic apparatus 100. At this time, the user input unit 200 may be embodied as a remote controller which includes four directional arrow keys and an OK key, but this is just an exemplary embodiment, and the user input unit 200 may be embodied by various kinds of input units such as a touch screen, a mouse, a pointing device, a Smart Phone, and a cellular phone.

The user input unit 200 may receive text data. In other words, the user input unit 200 which includes a touch pad, a touch keyboard, and a keyboard may receive text data to register as a trigger word or phrase.

In addition, if the user input unit 200 is embodied as a remote controller, the remote controller may include an input button for receiving a speech. The user may press an input button of a remote controller and utter a speech. In addition, an utterance of a user which is received first after the input button is pressed may be a trigger word or phrase.

A trigger word or phrase may be registered in the controller 120 by a text input or a speech input. Specifically, if a trigger word or phrase is registered through a text input, the controller 120 may display a user interface (UI) for receiving a trigger word or phrase by text via the display 150 and in response to the text being input via the displayed UI, the inputted text may be registered as a trigger word or phrase. Particularly, the controller 120 may receive text data through the user input unit 200.

In addition, if a trigger word or phrase is registered by a speech input, the controller 120 may register the speech of a user inputted through the speech input unit 110 as a trigger word or phrase. Specifically, while the UI for receiving a trigger word or phrase by an utterance is displayed via the display 150 and the UI is displayed, if a speech of a user is input through the speech input unit 110, the controller 120 may analyze the inputted speech of a user, convert the speech into text data, and register the converted text data as a trigger word or phrase.

The controller 120 may include a random access memory (RAM) 121, a read only memory (ROM) 122, a central processing unit (CPU) 123, and a graphic processing unit (GPU) 124, first to n-th interfaces 125-1~125-n, and a bus 126. At this point, the RAM 121, the ROM 122, the CPU 123, and the GPU 124, and the first to n-th interfaces 125-1~125-n may be connected with each other through a bus 126.

A set of commands for booting a system are stored in the ROM 122. In response to a turn-on command being input and power being supplied, the CPU 124 copies an operating system (O/S) stored in the storage 160 onto the RAM 121, and boots a system by executing the O/S according to a command stored in the ROM 122. In response to the booting being completed, the main CPU 124 copies various types of application programs stored in the storage 190 onto the RAM 121, and performs multiple different functions by executing the application programs copied onto the RAM 121.

The GPU 123 generates a screen which includes various objects such as an icon, an image, and text by using an operation part (not shown) and a rendering part (not shown). The operation part calculates attribute values such as a coordinate value, a form, a size, and a color, etc. of each object to be displayed according to a layout of a screen by using a control command received from the user input unit 200. The rendering part generates a screen in various layouts including an object based on the attribute value calculated from the operation part. The screen generated from the rendering part is displayed within a display area of the display 150. Particularly, the graphic processor 143 may generate different kinds of UIs for registering a trigger word or phrase by a speech input or a text input.

The main CPU 124 may access the storage 190 and perform booting by using an O/S stored in the storage 190. The main CPU 124 performs various kinds of operations by suing all types of programs, contents, and data stored in the storage 190.

In addition, the first to n-th interfaces 125-1 to 125-*n* are connected with at least some of the above-described types of elements. One of the interfaces may be a network interface which is connected to an external apparatus through a network.

By the electronic apparatus 100 as described above, the user may register a trigger word or phrase by a speech input or a text input, and may perform a trigger word or phrase registration and a speaker registration at the same time.

However, the trigger word or phrase may be registered through a speech of a user or a text input. If the trigger word or phrase is registered by a speech of a user, the electronic apparatus 100 may perform a trigger word or phrase registration and a speaker recognition at the same time.

First, as illustrated in the exemplary embodiments of FIG. 5A and FIG. 5B, a trigger word being inputted through a text input will be described.

Figure 5A:
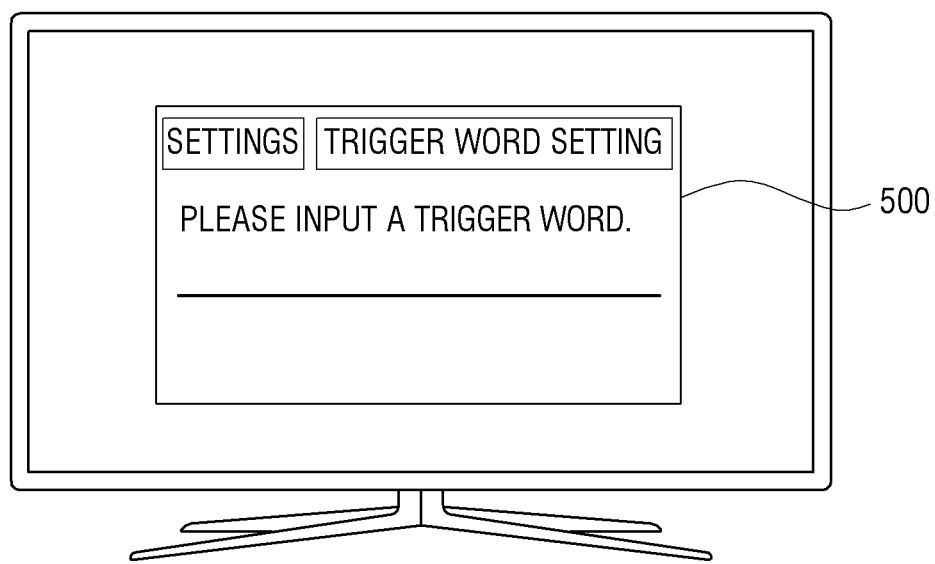
FIG. 5A and FIG. 5B are views illustrating a method of inputting a trigger word or phrase by text.

FIG. 5A is a view illustrating a situation in which the electronic apparatus 100 displays a user interface (UI) 500 for registering a trigger word by text according to an exemplary embodiment. Specifically, if a trigger word is registered in text according to a selection of a user, the electronic apparatus 100 may display the UI 500 for registering a trigger word in text and may receive a trigger word through the UI 500.

Particularly, the electronic apparatus 100 may receive text data for using as a trigger word through the user input unit 200. For example, the user input unit 200 is embodied as a remote controller or a cellular phone which is equipped with a touch pad, the user may input text directly in the touch pad through a finger or a pen separately equipped to control the user input unit 200. If the user input unit 200 is equipped with a touch keyboard, or a button in the form of a keyboard, the user may type text through a touch or a keyboard in the form of a button.

Figure 5B:
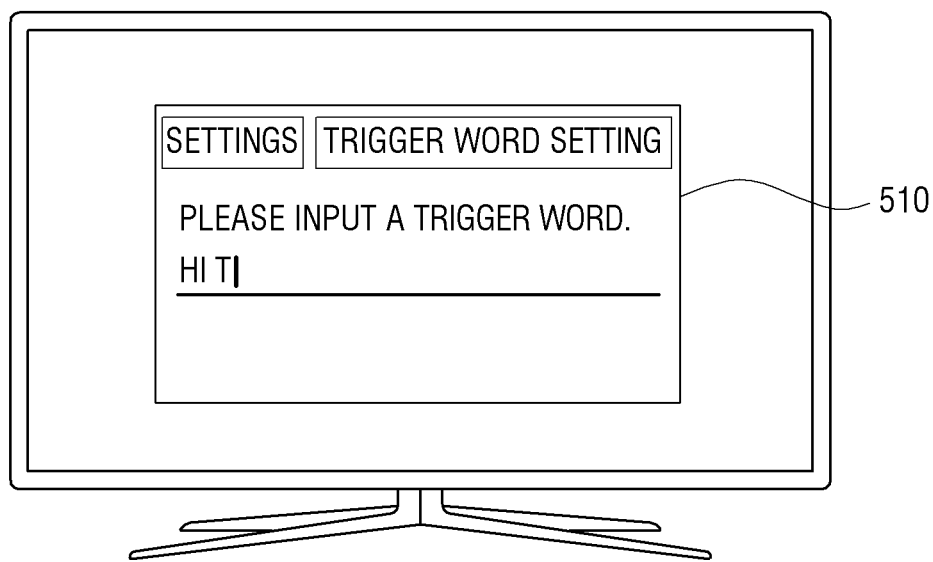

FIG. 5B is a view where a user interface (UI) 510 is displayed while "HI TV" is input as a trigger phrase by a random method among the above-described methods.

According to an exemplary embodiment, if "HI TV", a trigger phrase, is registered as text data, and if a speech of a user who spoke "HI TV" is input through the speech input unit 110, the electronic apparatus 100 may analyze phonemic characteristics and speaker's characteristics by analyzing the speech of a user.

Specifically, if the sound inputted through the speech determination module 191 is determined to include a speech of a user, the electronic apparatus 100 may detect a portion determined to be the speech of a user through the speech interval detection module 192. If phonemic and voice print characteristics are extracted through the speech characteristics detection module 193, and if a speech of the user inputted according to the extracted phonemic characteristics is "HI TV", the electronic apparatus 100 may store data for phonemic characteristics related to the phrase "HI TV", which is a trigger phrase registered as text data.

In other words, if a word or phrase which has the same phonemic characteristics as phonemic characteristics for a stored trigger word or phrase, is input, or a word or phrase which has phonemic characteristics within a critical range is input, the electronic apparatus 100 may determine that a trigger word or phrase has been input. Accordingly, if "HI TV", a trigger phrase, is input later, the electronic apparatus 100 may react at a fast speed based on a database for the stored trigger phrase. And since it is determined that "HI TV", a trigger phrase, has been input, the electronic apparatus 100 is changed to a speech recognition mode. Accordingly, after changing to a speech recognition mode, the electronic apparatus 100 may be controlled by an inputted speech of a user.

In addition, the extracted voice print characteristics may be registered as voice print characteristics of a user who spoke the speech. In other words, the electronic apparatus 100 may register a speaker by registering the voice print characteristics detected in the speech characteristics detection module 193 as voice print characteristics of a user who spoke the speech inputted in the voice print characteristics storage module 195.

For example, the voice print characteristics storage module 195 may match the detected voice print characteristics with an intrinsic identification according to a user, and store it. In addition, if a name or a nickname of the user who spoke the speech of a user is input by the user, the voice print characteristics storage module 195 may match the detected voice print characteristics with the inputted name or the nickname of the user and store it. The name or the nickname of the user may be received by text or a speech as part of the method of registering a trigger word or phrase, and be registered.

If the electronic apparatus 100 determines that the extracted voice print characteristics match the voice print characteristics pre-stored in the voice print characteristics storage module 195, an execution mode may be changed to a speech recognition mode corresponding to the registered user. A method of changing to a speech recognition mode corresponding to a registered user will be described in detail later.

Figure 6A:
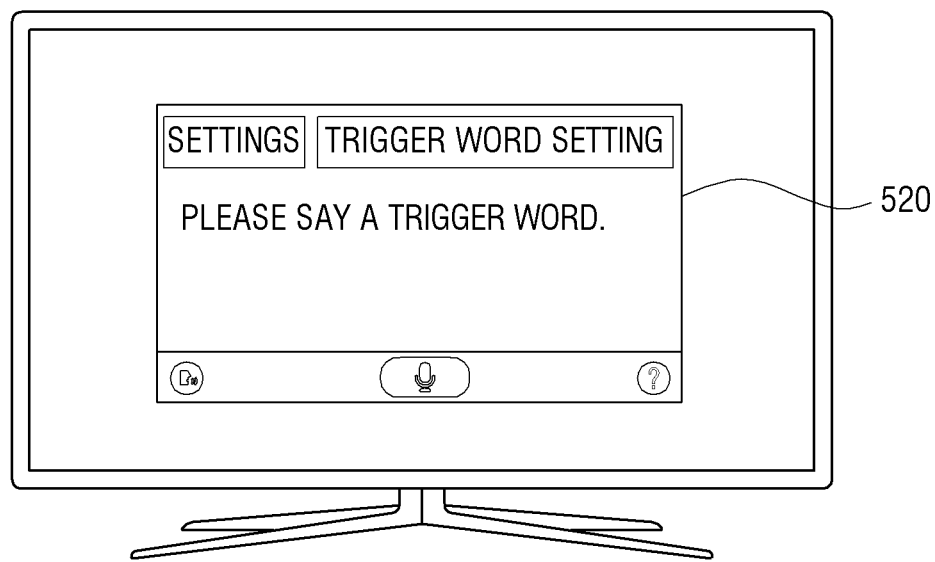
FIGS. 6A to 6C are views illustrating a method of inputting a trigger word or phrase by a speech of a user.
Figure 6B:
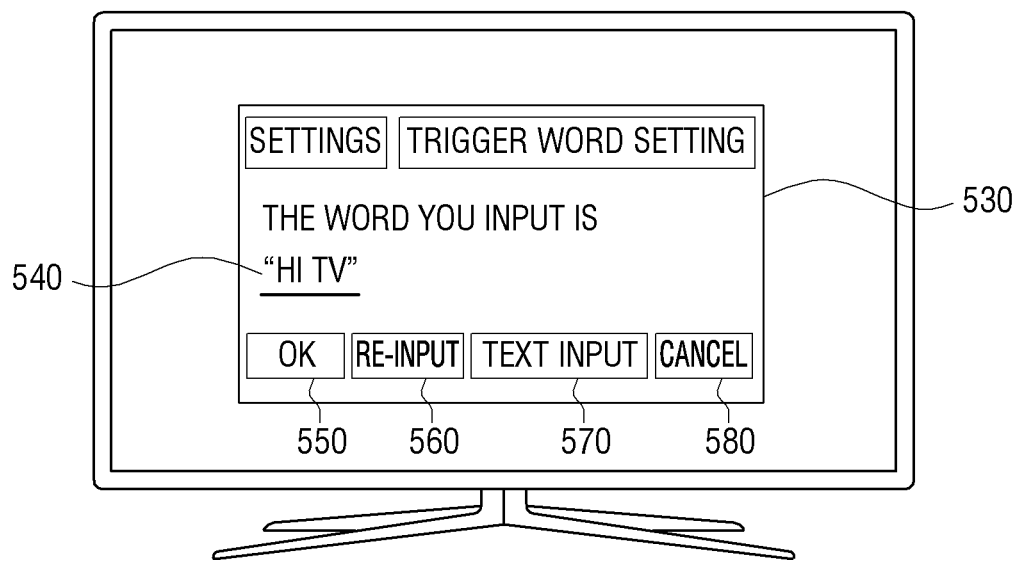
Figure 6C:
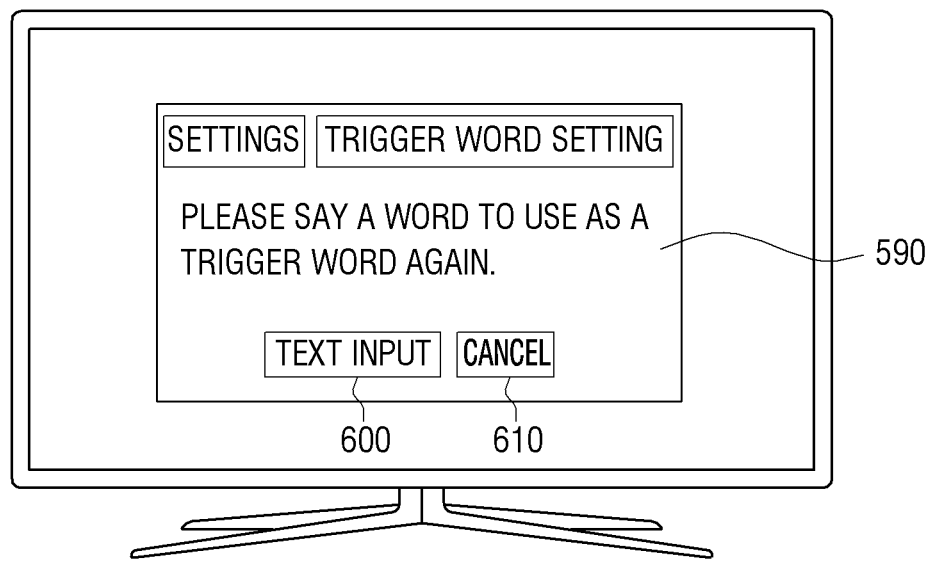

FIG. 6A to 6C are views illustrating a method of registering a trigger word or phrase by a user speaking a speech or making an utterance according to an exemplary embodiment. At this point, the electronic apparatus 100 may register a trigger word or phrase and a speaker at the same time.

FIG. 6A is a view illustrating a user interface (UI) 520 for registering a trigger word or phrase based on a speech of a user. Specifically, if a trigger word or phrase is registered based on a speech of a user according to a selection of the user, the electronic apparatus 100 may display the UI 520 for registering a trigger word or phrase by a speech of a user, and receive the trigger word or phrase. In other words, a sentence "speak a trigger word or phrase" may be displayed and by speaking a sentence to use as a trigger word or phrase within a critical range, the trigger word or phrase may be registered.

As described above, the electronic apparatus 100 may detect phonemic and voice print characteristics through the speech characteristics detection module 193. According to the detected phonemic characteristics, the electronic apparatus 100 may covert a speech of a user inputted as a trigger word or phrase into text data, and display the data on a user interface (UI) 530 in order to check a trigger word or phrase.

As illustrated in FIG. 6B, the UI 530 for checking a trigger word or phrase may display "HI TV 540" which is a result of an analysis of the inputted speech of a user. In addition, the UI 530 for checking a trigger word or phrase may display a selection menu such as "OK" 550, "RE-INPUT" 560, "TEXT INPUT" 570, and "CANCEL" 580.

In other words, if the result of speech recognition displayed by the electronic apparatus 100 corresponds to a spoken speech, the user may select the "OK" 550 menu option, and complete the registration of a trigger word or phrase.

If the result of speech recognition displayed by the electronic apparatus 100 does not correspond to a spoken speech, the user may select the "RE-INPUT" 560 menu option, and attempt to register a trigger word or phrase again. In other words, if the "RE-INPUT" 560 menu option is selected, the electronic apparatus 100 may display a user interface (UI) 520 for registering a trigger word or phrase by a speech of a user again as shown in FIG. 6A.

If the result of speech recognition displayed by the electronic apparatus 100 does not correspond to a spoken speech, or the speech recognition of the electronic apparatus 100 is not easily performed, the user may register a trigger word or phrase by text by using the "TEXT INPUT" 570 menu option. In this case, the electronic apparatus 100 may display a user interface (UI) 500 for registering a trigger word or phrase by text as shown in FIG. 5A. If the user wants to cancel the registration of a trigger word or phrase, the user may select the "CANCEL" 580 menu option.

If the electronic apparatus 100 is not able to recognize the inputted speech of a user, a sentence "PLEASE SAY A WORD TO USE AS A TRIGGER WORD AGAIN" 590 may be displayed as shown in FIG. 6C. In this case, the electronic apparatus 100 may display a menu option such as the "TEXT INPUT" 600 and the "CANCEL" 610. The user may register a trigger word or phrase by text by using the "TEXT INPUT" 600 menu option. The user may select the "CANCEL" 610 menu option if the user intends to cancel the registration of a trigger word or phrase.

By the methods as described above, the electronic apparatus 100 may register a trigger word or phrase based on a speech of a user. In other words, the electronic apparatus 100 may convert the speech of a user into text data by using phonemic characteristics detected in the speech characteristics detection module 193, and may register a trigger word or phrase. At the same time, the electronic apparatus 100 may perform a registration of a speaker by using voice print characteristics detected in the speech characteristics detection module 193.

In other words, the speech characteristics detection module 193 may detect a voice print which is a graph generated by a frequency distribution of an inputted speech of a user. The voice print has a different form according to an individual. Accordingly, the electronic apparatus 100 may use the voice print characteristics detected in the speech characteristics detection module 193 in order to distinguish a speaker.

In other words, the electronic apparatus 100 may register a speaker by registering voice print characteristics detected in the speech characteristics detection module 193 as voice print characteristics of a user who spoke the speech, in the voice print characteristics storage module 195.

For example, the voice print characteristics storage module 195 may match the detected voice print characteristics with an intrinsic identification according to a user and may store it. In addition, if a name or a nickname of a user who spoke a speech is received, the voice print characteristics storage module 195 may match the detected voice print characteristics with the name or the nickname of a user, and store it. The name or the nickname of a user may be registered with text data or a speech as the method of registering a trigger word or phrase.

If the extracted voice print characteristics are determined to be matched with the voice print characteristics pre-stored in the voice print characteristics storage module 195, the electronic apparatus 100 may change an execution mode to a speech recognition mode corresponding to a registered user. A method of changing an execution mode to a speech recognition mode corresponding to a registered user will be described in detail with reference to FIGS. 7A and 7B.

If the execution mode is changed to a speech recognition mode, and if a registration of a speaker is performed according to the voice print characteristics, the electronic apparatus 100 may execute a speech recognition mode corresponding to a user who is registered as a speaker.

For example, the electronic apparatus 100 may store a content according to a frequency of utilization of a user, may store a content which the user added to a list of 'My Favorite', or may store a list of contents which the user used within a predetermined period of time. In addition, the electronic apparatus 100 may store audio or video settings according to a user. Accordingly, if a speech recognition mode corresponding to a user who is registered as a speaker is executed, the electronic apparatus 100 may display data stored according to a user. In addition, if an additional speech of a user is inputted by the user, the electronic apparatus 100 may provide information according to the inputted speech by using the stored data.

Figure 7A:
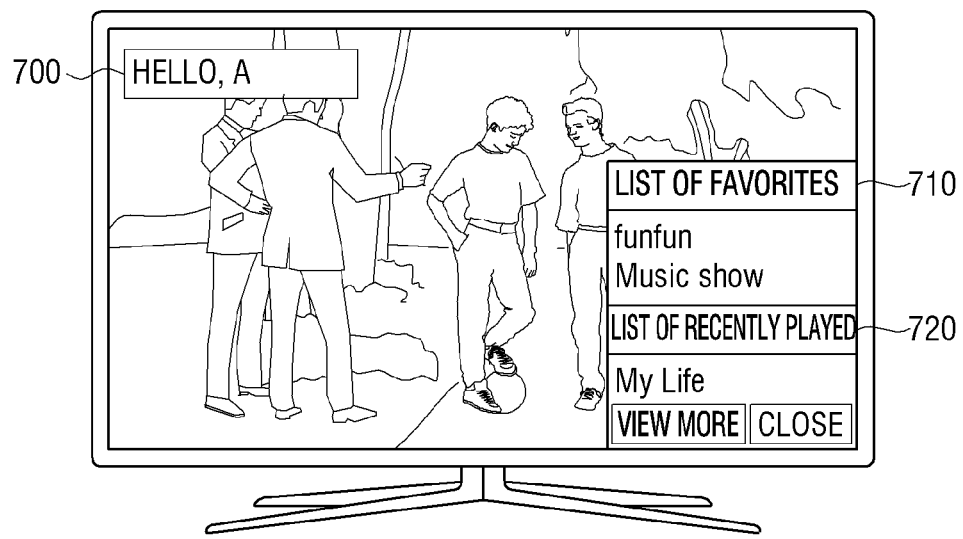
FIGS. 7A and 7B are views illustrating a method of executing a speech recognition mode according to a pre-registered user.

FIG. 7A is a view illustrating a screen displayed by the electronic apparatus 100 when extracted voice print characteristics match voice print characteristics pre-stored in the voice print characteristics storage module 195 according to an exemplary embodiment. In other words, the electronic apparatus 100 may display a result of recognizing a speaker by displaying a sentence "HELLO. A" 700.

The electronic apparatus 100 may display a 'LIST OF FAVORITES' 710 of a user or a 'LIST OF RECENTLY PLAYED' 720 on an arbitrary area of the display 150. In addition, the displayed 'LIST OF FAVORITES' 710 of a user or the displayed 'LIST OF RECENTLY PLAYED' 720 of a user may disappear from the screen after a predetermined time is exceeded even though a separate command of a user is not inputted.

Figure 7B:
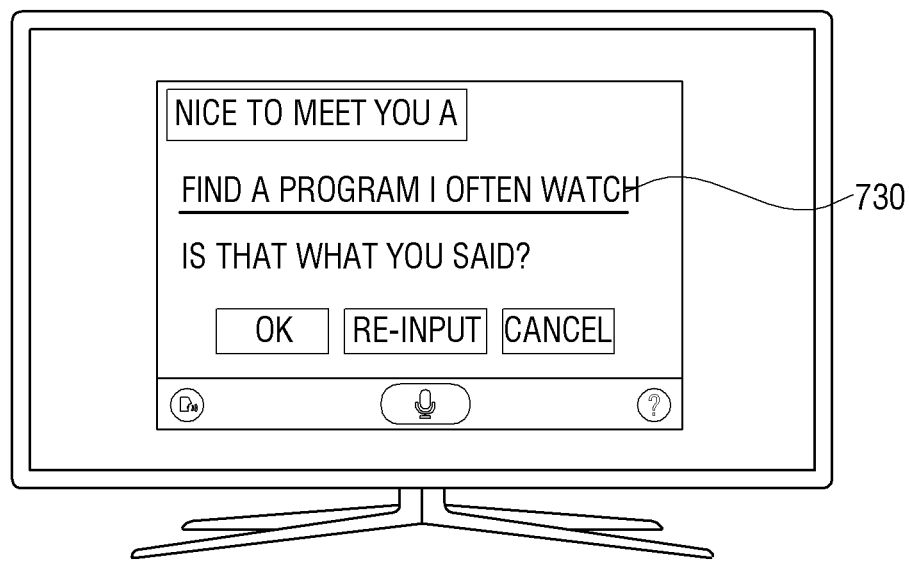

As shown in FIG. 7B, if a user who utters a trigger word or phrase is determined by the extracted voice print characteristics which match the voice print characteristics pre-stored in the voice print characteristics storage module 195, and if the user who utters the trigger word or phrase subsequently speaks a sentence "find a program I often watch" 730, the electronic apparatus 100 may display a result of recognizing the speech.

When the result of recognizing the speech is displayed, and a command that the result recognized by the electronic apparatus 100 matches the spoken speech is input, the electronic apparatus 100 may provide a list of favorite programs stored according to the recognized user.

FIG. 8 is a flow chart illustrating a method of speech recognition of an electronic apparatus according to an exemplary embodiment. If a speech of a user is inputted (S810), the electronic apparatus 100 analyzes the inputted speech of a user, and extracts phonemic characteristics for recognizing a speech and voice print characteristics for recognizing a speaker (S820). Specifically, the electronic apparatus 100 may extract the phonemic and voice print characteristics at the same time by using an integrated module.

The electronic apparatus 100 determines whether the speech of a user inputted according to the extracted phonemic characteristics corresponds to a registered trigger word or phrase, or not (S830). In other words, the electronic apparatus 100 may convert the speech of a user inputted according to phonemic characteristics into text data and may determine whether the data corresponds to the pre-registered trigger word or phrase.

If the inputted speech of a user corresponds to the pre-registered trigger word or phrase (S830-Y), the electronic apparatus 100 changes an execution mode to a speech recognition mode, and registers the extracted voice print characteristics as voice print characteristics of a user who spoke the speech (S840). In other words, the electronic apparatus 100 may perform a registration of the user who spoke the speech by using the extracted voice print characteristics.

However, if the mode is changed to the speech recognition mode by a trigger word or phrase, and the registration of a speaker is performed according to the voice print characteristics, the electronic apparatus 100 may execute the speech recognition mode with respect to the user who is registered as a speaker.

For example, the electronic apparatus 100 may store a content according to a frequency of utilization of a user, may store a content the user added to a list of favorites, or may store a list of contents the user used within a predetermined period of time. In addition, the electronic apparatus 100 may store audio or video settings according to a user.

Accordingly, after the registration of a speaker, if a speech of a user is inputted and if it is determined that voice print characteristics according to a result of an analysis of the speech of a user match voice print characteristics of a pre-registered speaker, the electronic apparatus 100 may execute a speech recognition mode corresponding to the user registered as a speaker, and provide data pre-stored according to the user.

In addition, if the extracted voice print characteristics do not match the pre-stored voice print characteristics even though the mode of the electronic apparatus 100 is changed to the speech recognition mode, the electronic apparatus 100 may register a new speaker.

Figure 9:
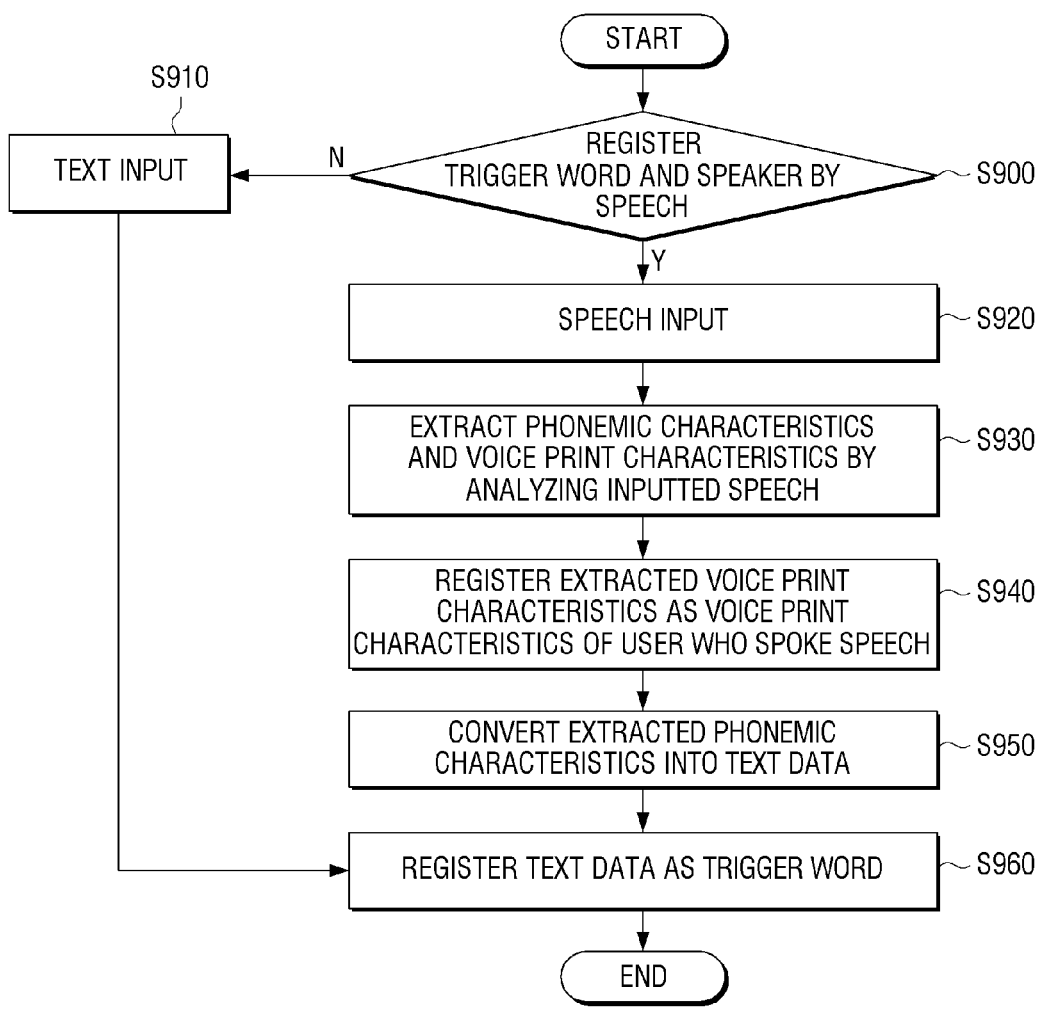
FIG. 9 is a flow chart illustrating a method of registering a trigger word or phrase of an electronic apparatus according to an exemplary embodiment.

FIG. 9 is a flow chart illustrating a method of registering a trigger word or phrase of the electronic apparatus 100 according to an exemplary embodiment. In other words, since the electronic apparatus 100 may register a trigger word or phrase by a text input or a speech input, FIG. 9 is a flow chart illustrating a method of registering a trigger word or phrase according to a text input or a speech input.

First of all, the electronic apparatus 100 determines whether to register a trigger word or phrase and a speaker based on a speech (S900). In other words, according to a selection of a user, if a trigger word or phrase is not received by a speech, the electronic apparatus 100 receives text for registering the trigger word or phrase (S910), and if the trigger word or phrase is received via speech, the electronic apparatus 100 registers the speech as a trigger word or phrase (S920).

The electronic apparatus 100 receives a speech of a user (S920), and extracts phonemic and voice print characteristics by analyzing the inputted speech (S930). Specifically, the electronic apparatus 100 may extract the phonemic and voice print characteristics at the same time by using an integrated module.

The electronic apparatus 100 registers the extracted voice print characteristics as voice print characteristics of a user who utters the speech (S940). In other words, since voice print characteristics are different according to an individual, in order to distinguish users, the electronic apparatus 100 may register a speaker by registering the extracted voice print characteristics as intrinsic voice print characteristics of a user who utters the speech.

In addition, the electronic apparatus 100 converts the extracted phonemic characteristics into text data (S950), and registers the text data as a trigger word or phrase (S960). If the electronic apparatus 100 receives a text input to register a trigger word or phrase (S910), the inputted text data may be registered as a trigger word or phrase immediately (S960).

Figure 10:
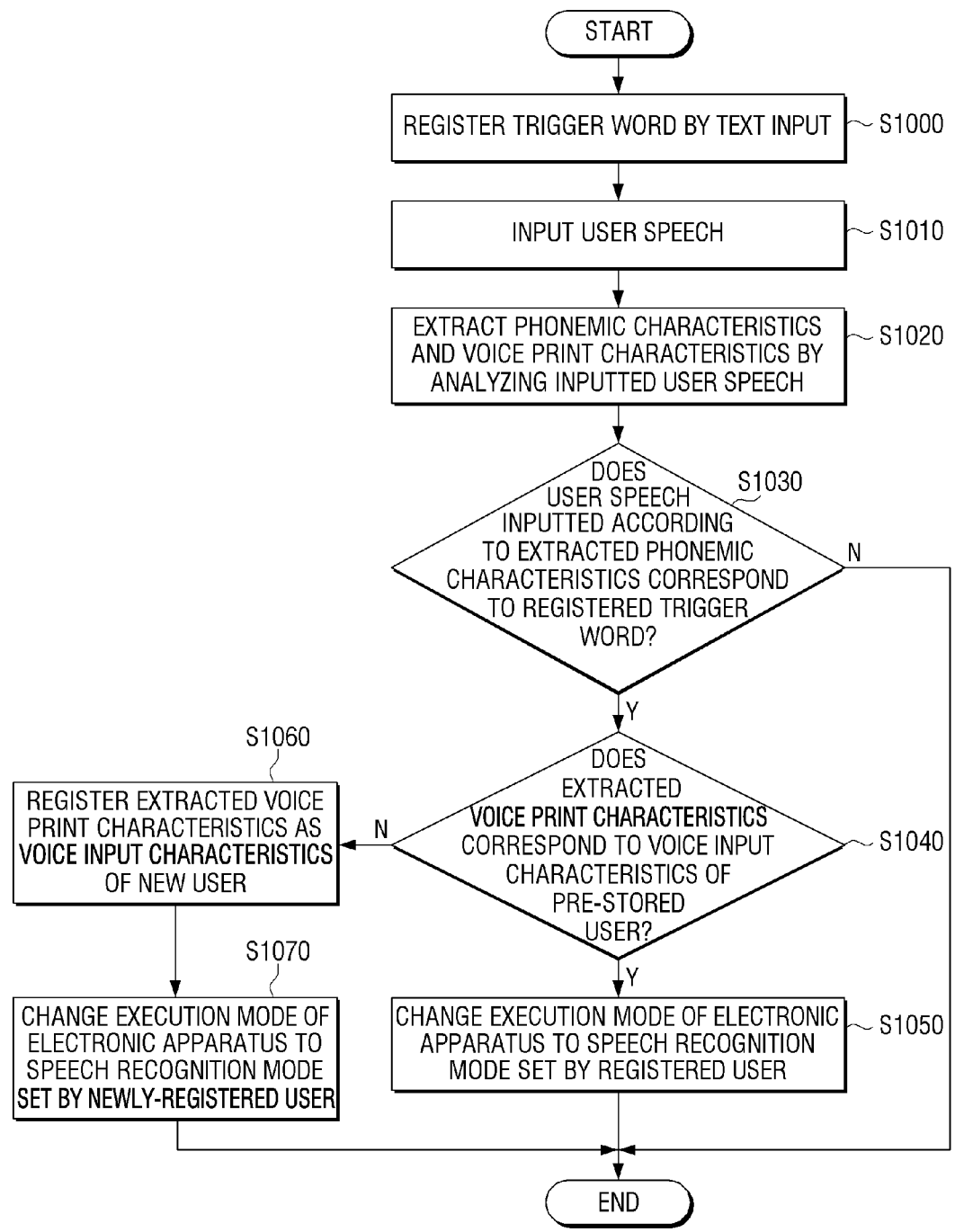
FIG. 10 is flow chart illustrating a method of changing to a speech recognition mode according to a user registered in an electronic apparatus according to an exemplary embodiment.

FIG. 10 is a flow chart illustrating a method of changing an execution mode to a speech recognition mode when, according to the above-described method, a trigger word or phrase is registered by a text input and the trigger word or phrase is spoken by a user.

First of all, if a trigger word or phrase is registered by a text input (S1000), and a speech of a user is inputted (S1010), the electronic apparatus 100 extracts phonemic characteristics and voice print characteristics by analyzing the inputted speech of the user that spoke (S1020). Particularly, the electronic apparatus 100 may extract the phonemic and voice print characteristics at the same time by using an integrated module.

If the speech of a user inputted according to the extracted phonemic characteristics corresponds to a registered trigger word or phrase (S1030), the electronic apparatus 100 determines whether the extracted voice print characteristics correspond to voice print characteristics of a pre-stored user (S1040).

If the extracted voice print characteristics correspond to voice print characteristics of a pre-stored user (S1040-Y), the electronic apparatus 100 changes an execution mode to a speech recognition mode set by the registered user (S1050).

If the extracted voice print characteristics do not correspond to the voice print characteristics of a pre-stored user (S1040-N), the electronic apparatus 100 registers the extracted voice print characteristics as voice print characteristics of a new user (S1060). The electronic apparatus 100 changes an execution mode to a speech recognition mode by a newly-registered user (S1070).

By the method as described above, even when a user registers a trigger word or phrase by text, the electronic apparatus 100 may simultaneously detect phonemic and voice print characteristics of the time when the trigger word or phrase was spoken, store phonemic characteristics for the registered trigger word or phrase, and perform a registration of a speaker by using voice print characteristics which are different.

The method of speech recognition of an electronic apparatus according to the above-described various exemplary embodiments may be coded as software and stored in a non-transitory computer readable medium. The non-transitory computer readable medium may be equipped in various types of apparatuses and used.

The non-transitory readable medium does not refer to a medium storing data for a short moment such as a register, a cache, or a memory, but refers to a medium which is capable of storing data semi-permanently and reading the data by an apparatus. Specifically, the non-transitory readable medium may be a compact disc (CD), a digital versatile disk (DVD), a hard disk, a Blu-ray disk, a universal serial bus (USB), a memory card, and a read only memory (ROM).

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of recognizing a speech of an electronic apparatus, the method comprising:
   receiving a speech of a speaker;
   analyzing the received speech of the speaker and extracting phonemic characteristics for recognizing the speech and voice print characteristics for registering the speaker;
   in response to the speech of the speaker corresponding to a pre-registered trigger word or phrase based on the extracted phonemic characteristics, changing to a speech recognition mode of the electronic apparatus and registering the extracted voice print characteristics as voice print characteristics of the speaker who spoke the speech; and
   in response to the extracted voice print characteristics being registered, displaying a graphic user interface (GUI) indicating whether the extracted voice print is registered.

2. The method as claimed in claim 1, further comprising:
   displaying a user interface (UI) for receiving the speech corresponding to the trigger word or phrase, in text form; and
   in response to text being input through the UI, registering the input text as the trigger word or phrase.

3. The method as claimed in claim 1, further comprising:
   receiving the speech of the speaker who speaks the speech;
   if the speech does not correspond to the pre-registered trigger word or phrase, analyzing the input speech of the speaker and converting the speech into text data; and
   registering the converted text data as a newly registered trigger word or phrase.

4. The method as claimed in claim 1, wherein the extracting further comprises:
   determining whether or not a sound inputted through a microphone equipped in the electronic apparatus includes the speech of the speaker; and
   classifying a portion of the sound which is determined to correspond to the speech of the speaker, and detecting characteristics of the speech of the speaker for the determined portion.

5. The method as claimed in claim 4, wherein the detecting characteristics of the speech of the speaker comprises extracting the phonemic characteristics and the voice print characteristics from the speech of the speaker, in parallel.

6. The method as claimed in claim 1, further comprising:
   in response to the extracted voice print characteristics not being within a critical range of voice print characteristics of a user registered in the electronic apparatus, registering the extracted voice print characteristics as voice print characteristics of a new user.

7. The method as claimed in claim 1, further comprising:
   in response to the extracted voice print characteristics being within a critical range of voice print characteristics of a user registered in the electronic apparatus, changing an execution mode of the electronic apparatus to the speech recognition mode corresponding to the registered user.

8. An electronic apparatus, comprising:
   a speech input receiver configured to receive a speech of a speaker; and
   a controller configured to extract phonemic characteristics for recognizing the speech and voice print characteristics for registering the speaker by analyzing the speech of the speaker received through the speech input receiver, and the controller configured to, in response to the speech of the speaker corresponding to a predetermined trigger word or phrase based on the extracted phonemic characteristics, change a mode of the electronic apparatus to a speech recognition mode and register the extracted voice print characteristics as voice print characteristics of the speaker who spoke the speech.

9. The apparatus as claimed in claim 8, further comprising:
   a display,
   wherein the controller controls the display to display a user interface (UI) for receiving text and in response to the text being input through the UI, registers the input text as a new trigger word or phrase.

10. The apparatus as claimed in claim 8, wherein in response to the speech of the speaker being input through the speech input receiver while a user interface (UI) for registering the trigger word or phrase is displayed, the controller analyzes the input speech of the speaker, converts the speech into text data, and registers the converted text data as a new trigger word or phrase.

11. The apparatus as claimed in claim 8, wherein the controller determines whether or not a sound inputted through a microphone includes the speech of the speaker, detects a portion of the sound which corresponds to the speech of the speaker, and detects characteristics of the speech of the speaker.

12. The apparatus as claimed in claim 11, wherein the controller extracts the phonemic characteristics and the voice print characteristics from detected characteristics of the speech of the speaker, in parallel.

13. The apparatus as claimed in claim 8, further comprising:
   a storage,
   wherein in response to the extracted phonemic characteristics not being within a critical range of voice print characteristics of a user pre-registered in the storage, the controller registers the extracted voice print characteristics as voice prints characteristics of a new user.

14. The apparatus as claimed in claim 8, wherein in response to the extracted voice print characteristics being within a critical range of voice print characteristics of a user registered in the electronic apparatus, the controller changes an execution mode of the electronic apparatus to the speech recognition mode which corresponds to the registered user.

15. The method as claimed in claim 4, wherein the detecting characteristics of the speech of the speaker comprises extracting the phonemic characteristics and the voice print characteristics from the speech of the speaker, simultaneously.

16. The apparatus as claimed in claim 11, wherein the controller extracts the phonemic characteristics and the voice print characteristics from detected characteristics of the speech of the speaker, simultaneously.

17. An electronic apparatus, comprising:
a display;
a speech input receiver configured to receive a speech of a speaker; and
a controller configured to extract phonemic characteristics for recognizing the speech and voice print characteristics for registering the speaker by analyzing the speech of the speaker received through the speech input receiver, and the controller configured to, in response to the speech of the speaker corresponding to a predetermined trigger word or phrase based on the extracted phonemic characteristics, change a mode of the electronic apparatus to a speech recognition mode and register the extracted voice print characteristics as voice print characteristics of the speaker who spoke the speech,
wherein in response to the speech of the speaker being input through the speech input receiver while a user interface (UI) for registering the trigger word or phrase is displayed on the display, the controller analyzes the input speech of the speaker, converts the speech into text data, and registers the converted text data as a new trigger word or phrase.

18. The apparatus as claimed in claim 17, wherein the controller controls the display to display a user interface (UI) for receiving text and in response to the text being input through the UI, registers the input text as a new trigger word or phrase.

19. The apparatus as claimed in claim 17, wherein the controller determines whether or not a sound inputted through a microphone includes the speech of the speaker, detects a portion of the sound which corresponds to the speech of the speaker, and detects characteristics of the speech of the speaker.

20. The apparatus as claimed in claim 18, wherein the controller extracts the phonemic characteristics and the voice print characteristics from detected characteristics of the speech of the speaker, in parallel.

* * * * *